United States Patent [19]

Grimaldo

[11] 4,221,359
[45] Sep. 9, 1980

[54] FOOT CONTROL FOR HYDRAULIC VALVE

[75] Inventor: Samuel Grimaldo, Thousand Oaks, Calif.

[73] Assignee: American Machine & Hydraulics Inc., Newbury Park, Calif.

[21] Appl. No.: 967,573

[22] Filed: Dec. 8, 1978

[51] Int. Cl.³ ............................................. F16K 31/62
[52] U.S. Cl. ................................... 251/295; 251/291; 251/293; 74/561; 222/179
[58] Field of Search ......................... 72/380, 381, 389; 251/293, 295, 324, 291; 4/272, 308, 409; 74/560, 561, 562; 91/424; 222/179

[56] References Cited
U.S. PATENT DOCUMENTS

| 262,324 | 8/1882 | Severy | 222/179 |
| 924,047 | 6/1909 | Ellmann | 222/179 |
| 1,103,736 | 7/1914 | Boor | 251/295 |
| 1,153,759 | 9/1915 | Brunker et al. | 251/295 |
| 1,690,923 | 11/1928 | Butler et al. | 251/324 |
| 2,456,958 | 12/1948 | Kretschmer et al. | 222/179 |
| 3,158,178 | 11/1964 | Fiala et al. | 251/295 |
| 3,231,236 | 1/1966 | Hodel et al. | 251/324 |
| 3,339,385 | 9/1967 | Lance | 72/389 |

Primary Examiner—William R. Cline
Assistant Examiner—H. Jay Spiegel
Attorney, Agent, or Firm—Ralph B. Pastoriza

[57] ABSTRACT

A hydraulic valve normally mounted at a convenient level for manual operation on a machine can be operated by a person's foot as opposed to his hand. Towards this end, there are provided mounting means for mounting the valve in an upside down position at the same level together with an elongated tube extending from the normally existing manually operable portion of the valve vertically downwardly terminating short of the floor. A transverse foot pedal is pivoted to the machine frame at the level of the lower end of the tube, this lower end in turn being pivoted to the same foot pedal at a point spaced from the first pivoting point. The arrangement is such that rocking movement of the foot pedal will actuate the valve in the same manner as manual actuation when the valve was upright.

2 Claims, 4 Drawing Figures

FOOT CONTROL FOR HYDRAULIC VALVE

This invention relates generally to foot control devices and more particularly to a foot control for a hydraulic valve normally disposed in a position for manual operation.

BACKGROUND OF THE INVENTION

Certain machines employ hydraulically operated components. Proper control of the hydraulics is generally carried out by manually operated hydraulic valves mounted on the machine frame at a convenient level for manual operation. As a specific example, there are provided pipe bending machines finding wide use in the shaping, for example, of automobile exhaust pipes. In operating these machines, the operator normally handles the pipe with both hands to position it in front of appropriate spaced shoe dies. A hydraulic valve is then manually actuated by the operator to cause a hydraulically operated ram to move against an opposite intermediate point of the pipe and thereby effect bending as a result of the three point contact between the shoes, ram and pipe.

In operations such as the foregoing, it would be very convenient if an operator could actuate or operate the hydraulic valve without having to remove one or both hands from a pipe or other object against which a hydraulic ram is to be brought. While it is possible, of course, to simply relocate the hydraulic valve to a lower position and provide an appropriate foot lever or the like for operating the valve, such entails radical modification of presently available equipment, not only in the relocation of the valve to a remote position but also in the necessity of changing the hydraulic hose line lengths and the like.

BRIEF DESCRIPTION OF THE PRESENT INVENTION

With the foregoing in mind, the present invention contemplates a foot control for a hydraulic valve wherein the same can readily be adapted to present equipment in which the hydraulic valve itself is normally located at a level for convenient manual operation.

More particularly, in accord with this invention there is provided a foot pedal mounted for movement between first and second foot pedal positions close to the floor or at a convenient level for actuation by an operator's foot. The normally provided manually operable hydraulic valve on the machine frame is then simply turned upside down and an elongated member such as a rod connected between the operating element for the valve which is now in a downward position and the referred to foot pedal.

With the foregoing arrangement, movement of the foot pedal between first and second foot pedal positions simultaneously moves the operating element for the valve between first and second element positions the same as was normally moved by the usual manual control when the valve was mounted in an upright position. The operator's hands are thus free to properly position a pipe or tube to be bent or otherwise worked on by the hydraulic equipment.

BRIEF DESCRIPTION OF THE DRAWINGS

A better understanding of this invention will be had by now referring to a preferred embodiment thereof as illustrated in the accompanying drawings in which.

DETAILED DESCRIPTION OF THE PREFERRED EMBODIMENT

Figure 1:
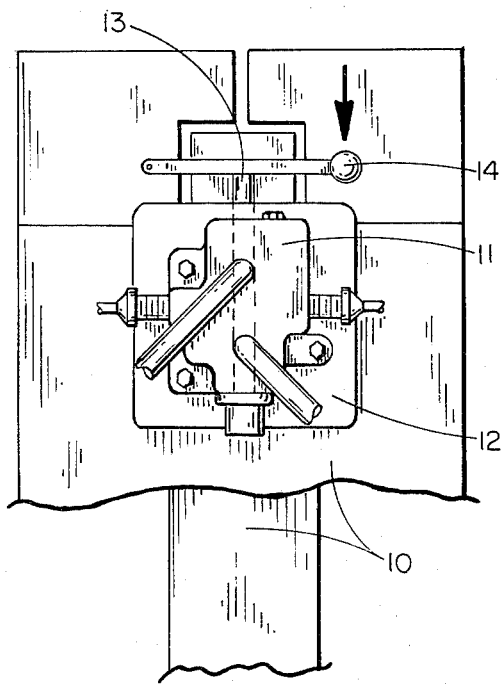
FIG. 1 is a front elevational view of a hydraulic valve secured to a machine frame at a convenient level for manual operation depicting a typical prior art installation.

Referring first to FIG. 1, there is shown a machine frame 10 upon which is mounted a hydraulic valve 11 as by mounting plate 12. Hydraulic valve 11 includes at its top end an operating element 13 which is moved between first and second positions as by a manually operable lever 14. Thus, a downward movement of the lever 14 to push the operating element 13 which might constitute the valve spool downwardly into the valve body would apply hydraulic fluid to an hydraulic ram for, as an example, bending pipe disposed in front of shoe dies indicated by the rectangular blocks above the valve 11. Manual upward movement of the lever 14 in turn would pull the operating element 13 upwardly from the valve body 11 to retract the ram.

The valve 11 is mounted to the frame 10 at a convenient position; for example, at approximately waist height, for manual operation by a person using the machine.

The structure described in FIG. 1 is presently known prior art.

Figure 2:
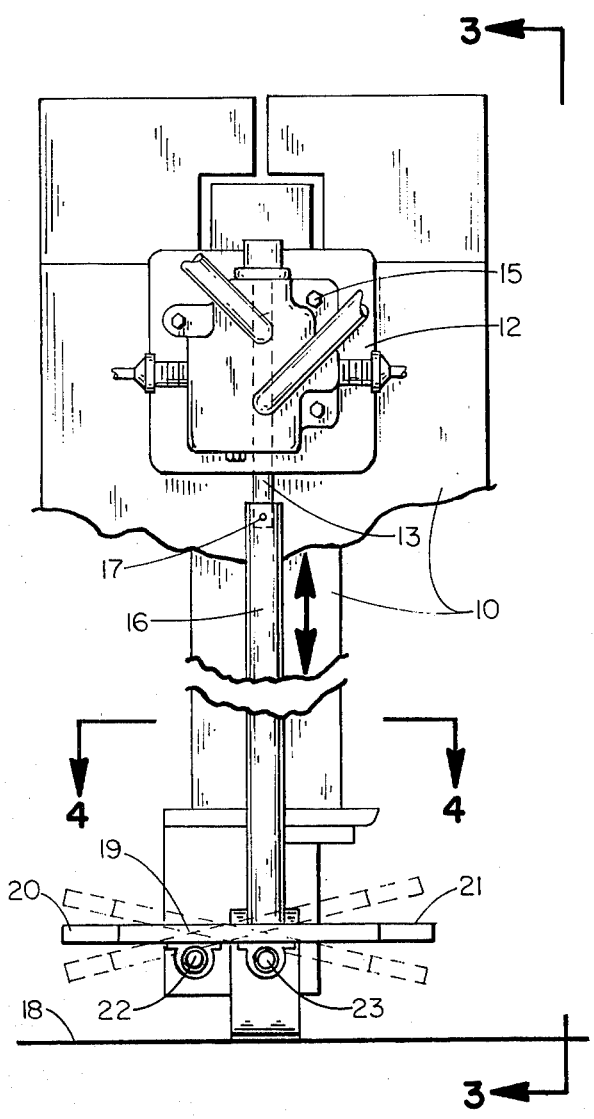
FIG. 2 is an elevational front view similar to FIG. 1 but illustrating the hydraulic valve of FIG. 1 remounted together with an appropriate foot control for operating the same in accord with the present invention.

Referring now to FIG. 2, there is illustrated in front view the foot control for the hydraulic valve 11 of FIG. 1. Essentially, mounting means in the form of new bolt holes and bolts, one of which is indicated at 15 in FIG. 2 is provided to permit mounting of the valve 11 in an upside down position from that illustrated in FIG. 1 but at the same level. In other words, the same mounting plate 12 can be used. This upside down orientation results in the operating element 13 now being positioned at the bottom end of the valve.

An elongated means in the form, for example, of a pipe or rod member 16 is pivoted at its top end 17 to the operating element 13. This elongated member 16 extends downwardly vertically to terminate at its lower end at a spaced distance from the floor 18.

Shown at approximately the same spacing from the floor is a transverse foot pedal 19 having foot engaging surfaces 20 and 21 at its opposite ends. Means 22 is provided for pivoting the foot pedal to a lower portion of the frame at a first point intermediate its end for rocking movement in a vertical plane; that is, the plane of the drawing as illustrated in FIG. 2 and by the phantom lines.

Another means in turn pivots the lower end of the tube member 16 to a second point of the foot pedal intermediate its ends and spaced from the first point as indicated at 23. The arrangement is such that when the foot pedal is rocked about the pivot means 22, the elongated member or rod 16 will be caused to move up and down as indicated by the double-headed arrow, thereby moving the operating element 13 into or out of the hydraulic valve 11.

Figure 3:
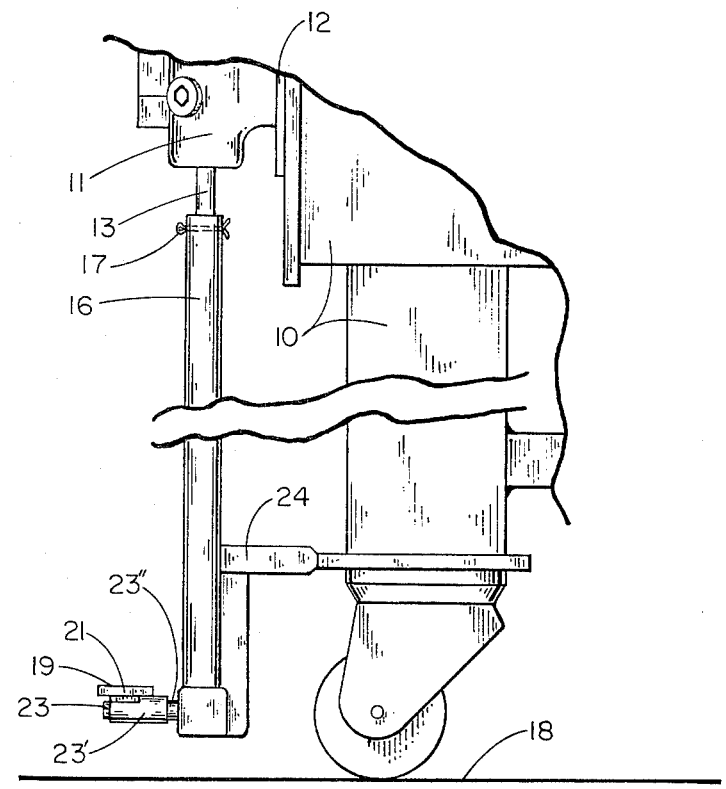
FIG. 3 is a fragmentary side elevational view taken in the direction of the arrows 3—3 of FIG. 2; and, FIG. 4 is a cross sectional view looking downwardly in the direction of the arrows 4—4 of FIG. 2.

Referring to FIG. 3, there is illustrated at 24 behind the rod or tube member 16 a suitable frame portion for mounting the first referred to pivot means 22 described in FIG. 2 to the frame 10. Also illustrated in the side elevation of FIG. 3 is the means pivoting the lower end of the tube 16 to the foot pedal 19. This means comprises a cylindrical sleeve 23' secured to the foot pedal 19 with its axis horizontal and at right angles to the transverse foot pedal. A journal 23" in turn extends laterally from the lower end of the elongated member 16 to be received in the sleeve 23'. With this arrangement, the lower end of the elongated member 16 is positively moved up and down upon rocking movement of the foot pedal in first and second directions respectively.

Figure 4:
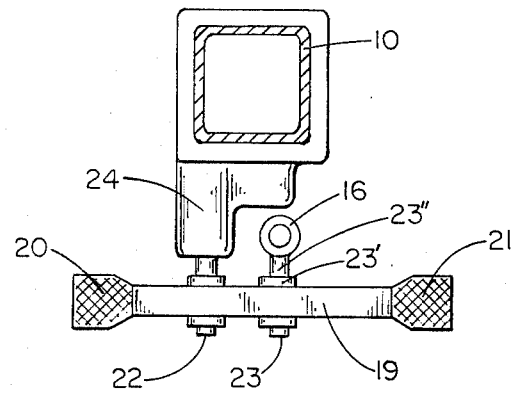

FIG. 4 illustrates more clearly the spacing of the respective means pivoting the foot pedal 19 to the frame 10 as by the structure 24 and the pivoting of the second point of the foot pedal 19 to the lower end of the elongated rod or tube member 16. It will be evident that because of the upper pivoting point 17 described in FIGS. 2 and 3 of the elongated rod member 16, the lower end thereof can move laterally slightly to accommodate the arcuate movement of the foot pedal when rocked. Moreover, it will be appreciated that the journal 23" is retained within the sleeve 23' so that positive up and down forces can be applied to the elongated member to positively actuate the operating element 13 of the valve, all as described heretofore.

From all of the foregoing, it will thus be seen that the present invention has enabled the conventionally manually operated hydraulic valve to be readily converted to foot operation, all to the end that an operator's hands are left free for manipulating objects to be treated in the machine. Since the hydraulic valve is merely turned upside down, there is no need to change the lengths of the hose lines connecting thereto or to be concerned with any major modifications of the frame structure.

Assuming, for the sake of illustrating operation of the foot control, that an inward movement of the operating element 13 into the valve body 11 as depicted in FIG. 1 actuates movement of a hydraulic ram outwardly, then depression of the left foot engaging surface 20 depicted in FIG. 4 will effect a similar operation. Again, assuming that outward movement of the operating element 13 from the valve body 11 retracts a hydraulic ram, then depression of the opposite foot engaging surface 21 depicted in FIG. 4 of the foot pedal will result in this movement of the operating element. Thus, the first and second positions of the operating element are effected by similar first and second rocked positions of the foot pedal.

I claim:

1. In a machine frame incorporating an hydraulic valve normally provided at its top end with an operating element for operating said valve and wherein the valve is mounted on the frame at a level convenient for manual operation of said element, a foot control for said valve including, in combination:
   (a) mounting means for mounting said valve upside down to said frame at said same level so that said element is positioned at the bottom end of said valve;
   (b) an elongated member pivoted at its top end to said element and extending vertically downwardly to terminate at its lower end at a spaced distance from the floor;
   (c) a transverse foot pedal having foot engaging surfaces at its opposite ends;
   (d) means pivoting said foot pedal to a lower portion of said frame at a first point intermediate its ends for rocking movement in a vertical plane; and,
   (e) means pivoting said lower end of said member to a second point of the foot pedal intermediate its ends and spaced from said first point, whereby an operator can step on either one or the other of said foot engaging surfaces to rock said foot pedal in one direction or the other without interference from said means pivoting said foot pedal to a lower portion of said frame or said means pivoting said lower end of said member to a second point of the foot pedal.

2. The subject matter of claim 1, in which said means pivoting said lower end of said member to said foot pedal includes a cylindrical sleeve secured to said foot pedal at said second point with its axis horizontal and at right angles to said transverse foot pedal; and a journal extending laterally from the lower end of said elongated member receivable in said sleeve so that said member is positively moved up and down upon rocking movement of said foot pedal in one direction or the other, respectively.

* * * * *